United States Patent [19]

Hunter

[11] 4,064,830

[45] Dec. 27, 1977

[54] APPARATUS FOR COATING AND DEWEBBING TIRE CORD FABRIC

[75] Inventor: Edward E. Hunter, Akron, Ohio

[73] Assignee: The Goodyear Tire & Rubber Company, Akron, Ohio

[21] Appl. No.: 695,214

[22] Filed: June 3, 1976

[51] Int. Cl.² .............................................. B05C 11/06
[52] U.S. Cl. ...................................... 118/57; 118/63; 118/405
[58] Field of Search ..................... 118/57, 62, 63, 404, 118/405; 427/348; 15/306 A

[56] References Cited

U.S. PATENT DOCUMENTS

| | | | |
|---|---|---|---|
| 1,328,541 | 1/1920 | Palmer | 427/348 |
| 2,450,847 | 10/1948 | Wilson | 118/57 X |
| 2,700,366 | 1/1955 | Griebling | 118/57 X |
| 2,889,802 | 6/1959 | Lessig et al. | 118/57 |
| 3,250,248 | 5/1966 | Alexeff | 118/63 X |
| 3,961,601 | 6/1976 | Hunter | 118/57 |

*Primary Examiner*—Robert R. Mackey
*Attorney, Agent, or Firm*—F.W. Brunner; R.S. Washburn

[57] ABSTRACT

A dewebbing unit and dip tank used in the treatment of tire cord fabric with a liquid coating containing an agent for increasing the bond between the cords of the fabric and rubber material used in the production of tires. The dip tank has a pair of weirs which the liquid coating is caused to overflow for contact with the tire cord fabric which is directed across the weirs. The dewebbing unit includes a chamber in which fluid, under pressure, is alternately passed through the fabric from opposing sides of the fabric to simultaneously vibrate the fabric and pass air through the pores of the fabric.

16 Claims, 2 Drawing Figures

APPARATUS FOR COATING AND DEWEBBING TIRE CORD FABRIC

BACKGROUND OF THE INVENTION

The invention is directed to the provision of an improved apparatus used in the dipping of plain woven tire cord fabric in a liquid coating and subsequent dewebbing of the fabric by the removal of excess liquid coating blocking the pores of the fabric.

Briefly stated, the invention is in the combination of a dewebbing unit and dip tank. The dip tank has a pair of horizontally disposed weirs which liquid coating is caused to overflow. Means are provided for directing the fabric through liquid coating overflowing the weirs. The dewebbing unit essentially comprises an enclosed chamber in which streams of air, under pressure, are alternately passed through the fabric from opposing sides of the fabric.

DESCRIPTION OF THE DRAWING

The following description of the invention will be better understood by having reference to the annexed drawing, wherein.

DETAILED DESCRIPTION OF THE INVENTION

Figure 1:
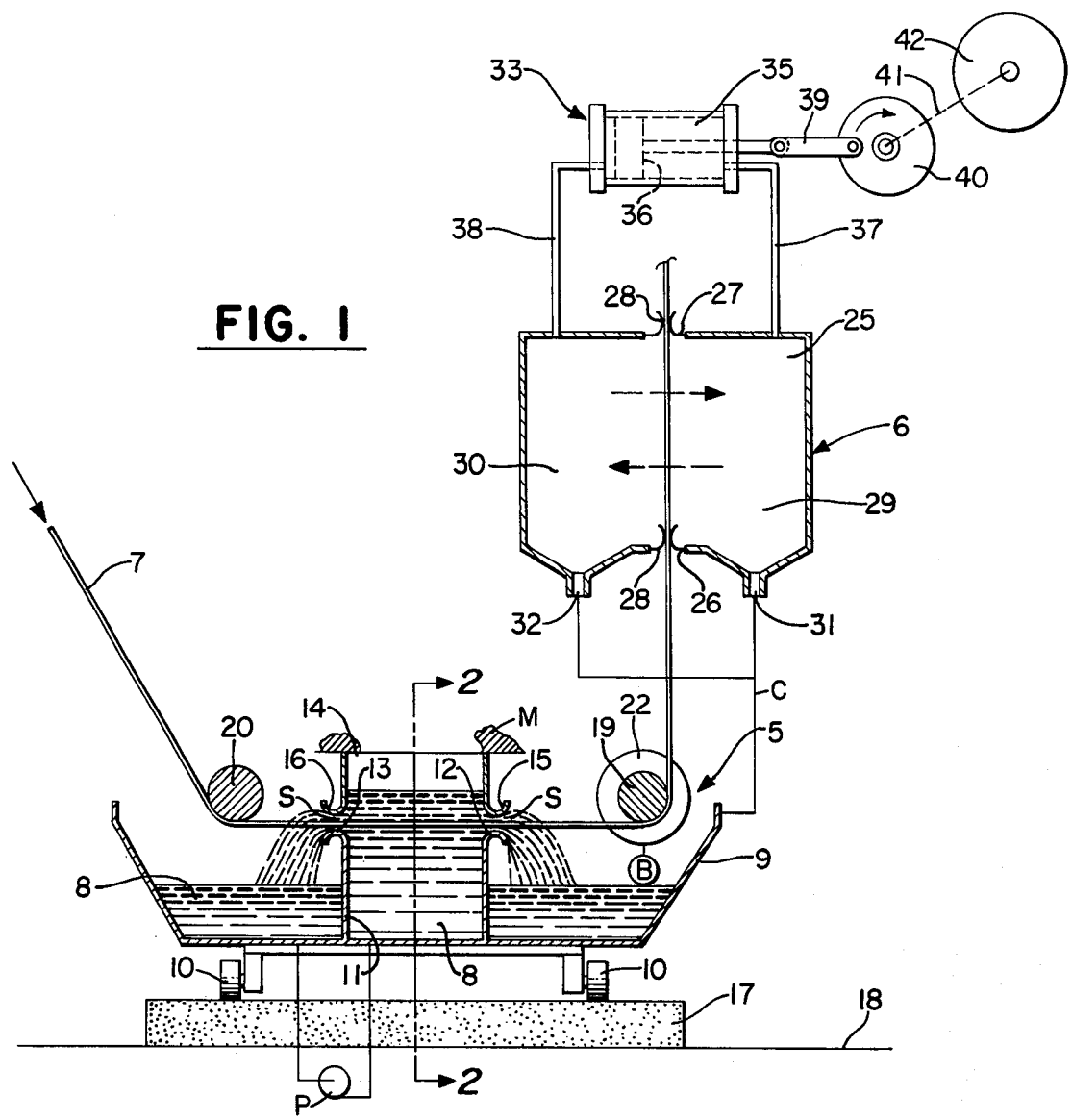
FIG. 1 is a section of a dip tank and dewebbing unit made in accordance with the invention.

With reference to the drawing, there is shown a dip tank 5 and dewebbing unit 6 through which a continuous sheet of plain woven tire cord fabric 7 is successively passed for treatment with a liquid coating 8 that contains an agent for promoting the bond between the warp cords of the fabric 7 and rubber material used in the production of tires, and subsequent removal of excess liquid coating 8 which fills and blocks the pores of the fabric 7 formed by the intersecting warp cords and weft threads of the fabric 7.

Dried liquid coating in the pores of the fabric 7 has an adverse effect on the adhesive between the fabric 7 and the rubber material in which the fabric 7 is embedded.

The dip tank 5 comprises a rigid, metal container or catch basin 9 which is mounted on a number of casters or wheels 10. A supply tank 11, for holding liquid coating 8 is centrally disposed within the catch basin 9. The bottom of the catch basin 9 is also the bottom of the supply tank 11. The supply tank 11 is provided with at least one pair of parallel weirs 12 and 13 which are equally spaced from the bottom of the supply tank 11, and which liquid coating 8 is caused to overflow into the surrounding catch basin 9.

A box 14, having the same general dimensions of the supply tank 11, is fixedly disposed above, and vertically aligned with the supply tank 11 by any suitable means M. The box 14 is also supplied with at least one pair of weirs 15 and 16 which are opposite and parallel the weirs 12 and 13 of the supply tank 11. The box 14, as best seen in FIG. 1, allows liquid coating 8 to rise to a level above the supply tank 11 and the horizontally aligned slots S formed between the opposing pairs of weirs 12, 15 and 13, 16 of the supply tank 11 and box 14. The supply tank 11 is raised and lowered to and from the box 14 by rolling the catch basin 9 on and off a ramp 17 which extends from the floor 18 of the building in which the dip tank 5 and dewebbing unit 6 are located.

Figure 2:
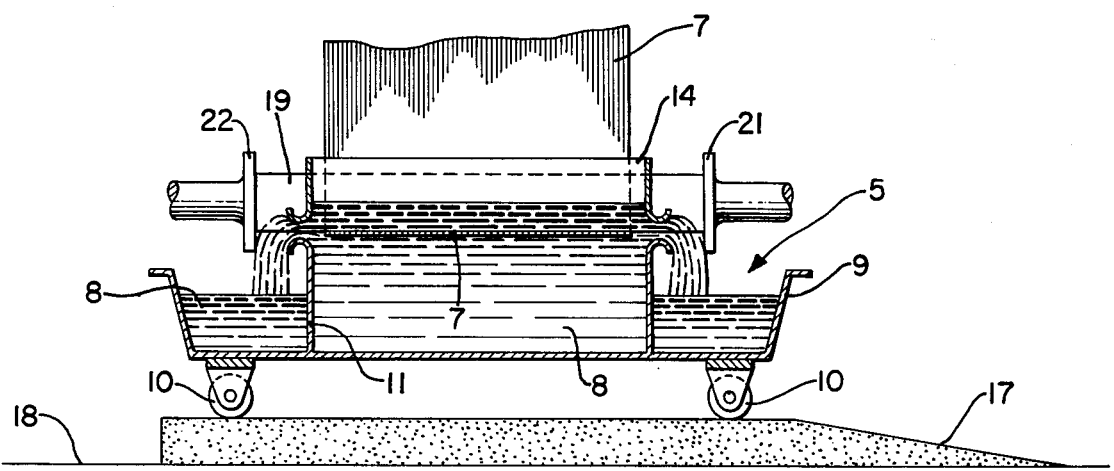
FIG. 2 is a section of the dip tank viewed from the line 2—2 of FIG. 1.

A pair of elongated rollers 19 and 20 are disposed in parallel relation adjacent opposite sides of the box 14 and supply tank 11 to guide or direct the tire cord fabric 7 into contact with liquid coating 8 overflowing the weirs 12 and 13 of the supply tank 11. The roller 19, located downstream from the supply tank 11, is provided with a pair of slinger flanges 21 and 22 (FIG. 2) for deflecting liquid coating 8 flung from the downstream roller 19, back into the catch basin 9 for subsequent recirculation to the supply tank 11. The downstream roller 19 is also provided with a brake B to increase the frictional coaction between the roller 19 and fabric 7 passing over the roller 19. Any suitable pumping mechanism P can be utilized for pumping liquid coating 8 from the catch basin 9 into the supply tank 11. The fabric 7, after passage through the liquid coating 8 in the dip tank 5, is directed upwardly through the dewebbing unit 6.

The dewebbing unit 6 comprises a treatment chamber 25 having an inlet 26 and outlet 27 which are vertically aligned and contain conventional flap seals 28 for sealing the chamber 25 from the ambient atmosphere. The upwardly moving fabric 7 passes through the inlet 26 and outlet 27 and divides the chamber 25 into two compartments 29, 30 which have separate drains 31, 32 through which excess liquid coating 8, removed from the fabric 7, is drained from the dewebbing unit 6 through conduit C for recirculation to the supply tank 11 of the dip tank 5.

Streams of fluid, e.g. air, are alternately supplied, under pressure, to the compartments 29, 30 for passage through the fabric 7 from opposing sides of the fabric. The direction from which the streams of air are passed through the moving fabric 7, is changed at a rate of from 500 to 5000 times per minute. The air streams at a high velocity, e.g. from 15,000–20,000 feet per minute. Thus, the moving fabric 7 is contacted by an oscillating high velocity stream of air which causes the fabric 7 to vibrate in the treatment chamber 25 of the dewebbing unit 6. The vibration of the fabric 7, coupled with the passage of air at great velocity through the pores of the fabric 7, provides a highly improved dewebbing action upon the fabric 7.

Any suitable mechanism, generally indicated at 33 can be employed to alternately circulate streams of air between the compartments 29, 30 of the dewebbing unit 6. The mechanism 33, in this instance, comprises a cylinder 35 in which a piston 36 is reciprocated to alternately force air under pressure, into air hoses 37 and 38 leading to the compartments 29 and 30, respectively. As is apparent from FIG. 1, reciprocation of the piston 36 alternately forces fluid, e.g. air, into one of the compartments 29, 30 and pulls air out of the other compartment. The pressure in the respective compartments is thus rapidly alternated above and below a mean pressure, e.g. atmospheric. Te alternation of pressure causes some flow of air or fluid through the fabric as well as oscillation of the fabric. The piston 36 within the cylinder 35, is reciprocated at the aforementioned rate by any suitable linkage 39 which, for example, is eccentrically coupled to a plate 40 that is mounted on the shaft 41 of a conventional electric motor 42.

Thus, there has been provided a highly improved apparatus used in the treatment of tire cord fabric with a liquid coating for increasing the bond between the fabric and rubber material.

I claim:

1. An apparatus used in the treatment of plain woven tire cord fabric, comprising:
   a. means for contacting tire cord fabric with a liquid coating containing an agent for promoting the bond between cords of the fabric and rubber material used in the production of tires; and
   b. means downstream of the fabric contacting means (a) for dewebbing the fabric coated with the liquid coating, said means including:
   I. a chamber sealed from the ambient atmosphere;
   II. means for guiding the fabric in a vertical plane through the chamber between opposing sides thereof, thereby forming two compartments separated by said fabric;
   III. means for alternately circulating fluid, under pressure, to the compartments
   and for alternately evacuating fluid from the compartments in correlated relation to the circulation of fluid to the compartments.

2. The apparatus of claim 1, wherein the means for alternately circulating fluid, under pressure, to the compartments includes means for alternating circulation of the fluid at a rate of from 500 to 5000 times per minute.

3. The apparatus of claim 2, which includes means for draining liquid coating from the two compartments.

4. The apparatus of claim 3, wherein the fabric coating contacting means (a) includes:
   I. means for guiding the fabric along a horizontal pathway;
   II. a supply tank for holding the liquid coating, the tank including a pair of parallel weirs which liquid coating is caused to overflow; and
   III. means for catching liquid coating overflowing the weirs and recirculating it to the supply tank.

5. The apparatus of claim 4, wherein the means for catching liquid coating overflowing the weirs includes a catch basin surrounding the supply tank.

6. The apparatus of claim 5, including means for mounting the supply tank and catch basin for unitary movement, and means for raising and lowering the supply tank relative to fabric moving in the horizontal pathway.

7. The apparatus of claim 6, wherein the means for guiding the fabric along a horizontal pathway, includes:
   IV. a pair of elongated rollers which are rotatable about parallel axes, one of the pair of rollers being downstream of the supply tank and the other of the pair of rollers being upstream of the supply tank; and
   V. means coacting with the roller downstream of the tank for deflecting liquid coating, flung from the roller, into the catch basin.

8. The apparatus of claim 7, which includes means for braking rotation of the roller downstream of the supply tank.

9. The apparatus of claim 7, which includes:
   VI. a box coacting with the supply tank for causing the level of liquid coating to rise above the weirs, the box including a second pair of weirs which are opposite and parallel the weirs of the supply tank, and coact with the weirs of the supply tank to form a slot through which the overflowing fluid passes; and
   VII. means for positioning the box between the rollers in fixed vertically spaced relation above fabric moving between the rollers.

10. An apparatus used in the treatment of plain woven tire cord fabric, comprising:
    a. means for contacting tire cord fabric with a liquid coating containing an agent for promoting the bond between cords of the fabric and rubber material used in the production of tires, said means including:
    I. means for guiding the fabric along a horizontal pathway;
    II. a supply tank for holding liquid coating, the tank including a pair of parallel weirs which liquid coating is caused to overflow;
    III. a catch basin surrounding the supply tank for catching liquid coating overflowing the weirs and recirculating it to the supply tank;
    IV. means for mounting the supply tank and catch basin for unitary movement; and
    b. means downstream of the fabric contacting means (a) for dewebbing the fabric.

11. The apparatus of claim 10, wherein the fabric guiding means (I) includes a pair of spaced, elongated rollers, one of the rollers being downstream from the supply tank and the other of the rollers being upstream from the supply tank, means for mounting the rollers for rotation about parallel axes, and means for directing liquid coating flung from the roller downstream from the supply tank, into the catch basin for recirculation to the tank.

12. The apparatus of claim 11, wherein the dewebbing means (b) includes:
    I. a chamber sealed from the ambient atmosphere;
    II. means for guiding the fabric in a vertical plane through the chamber between opposing sides thereof, thereby forming two compartments separated by said fabric;
    III. means for alternately circulating fluid, under pressure, to the compartments
    and for alternately evacuating fluid from the compartments in correlated relation to the circulation of fluid to the compartments.

13. The apparatus as claimed in claim 12, wherein the means for alternately circulating fluid, under pressure, to the compartments includes means for alternating circulation of the fluid at a rate of from 500 to 5000 times per minute.

14. The apparatus of claim 13, which includes means for removing liquid coating from the two compartments.

15. The apparatus of claim 14, which includes means for braking rotation of the roller downstream of the supply tank.

16. The apparatus of claim 14, wherein the fluid circulated to the compartments is air which is forced into the compartments at a velocity of from 15000 to 20000 feet per minute.

* * * * *